United States Patent

[11] 3,584,203

| [72] | Inventors | Rupert Patzelt;<br>Wolfgang Attwenger, both of Vienna, Austria |
|---|---|---|
| [21] | Appl. No. | 656,249 |
| [22] | Filed | July 26, 1967 |
| [45] | Patented | June 8, 1971 |
| [73] | Assignee | Osterreichische Studiengesellschaft Fur Atomenergie Ges. m.b.H.<br>Vienna, Austria |
| [32] | Priority | July 26, 1966 |
| [33] | | Austria |
| [31] | | A7141/66 |

[54] METHOD AND AN ARRANGEMENT FOR PRODUCING CONTROL SIGNALS FOR AUTOMATICALLY CONTROLLED DEVICES
20 Claims, 1 Drawing Fig.

[52] U.S. Cl. .................................................. 235/151.1,
235/151.3, 318/601
[51] Int. Cl. ....................................................... G06f 15/46
[50] Field of Search ........................................... 235/151.11,
151.1, 151.12, 151.3; 318/6, 18, 28

[56] References Cited
UNITED STATES PATENTS

| 2,933,626 | 4/1960 | Giboney et al. ............... | 318/6X |
| 2,972,268 | 2/1961 | Wallace et al. ............... | 318/6X |
| 3,206,683 | 9/1965 | Davis et al. ................... | 318/18X |
| 3,214,660 | 10/1965 | Smoot .......................... | 318/28 |
| 3,427,442 | 2/1969 | Sklaroff ........................ | 235/151.1 |

*Primary Examiner*—Malcolm A. Morrison
*Assistant Examiner*—Felix D. Gruber
*Attorney*—Ernest G. Montague

ABSTRACT: A method of and arrangement for the production of a control signal for automatically operated devices, wherein the control signal is derived from a digital value to be measured repeatedly, which comprises the steps of forming the individual difference signals between an actual measured digital value and a reference value of each individual measurement, and storing the individual difference signals. The individual difference signals are each compared with settable limit values representing statistical variations of the measured value and representing erroneous measurements and material faults of the goods to be measured. A control signal is emitted upon surpassing of the limit value for the statistical variation by an individual difference signal, to a regulating unit control of the control device, and the individual difference signals are cancelled and the emittance of a control signal suppressed upon surpassing another limit value repressing the erroneous measurements and material faults.

PATENTED JUN 8 1971  3,584,203
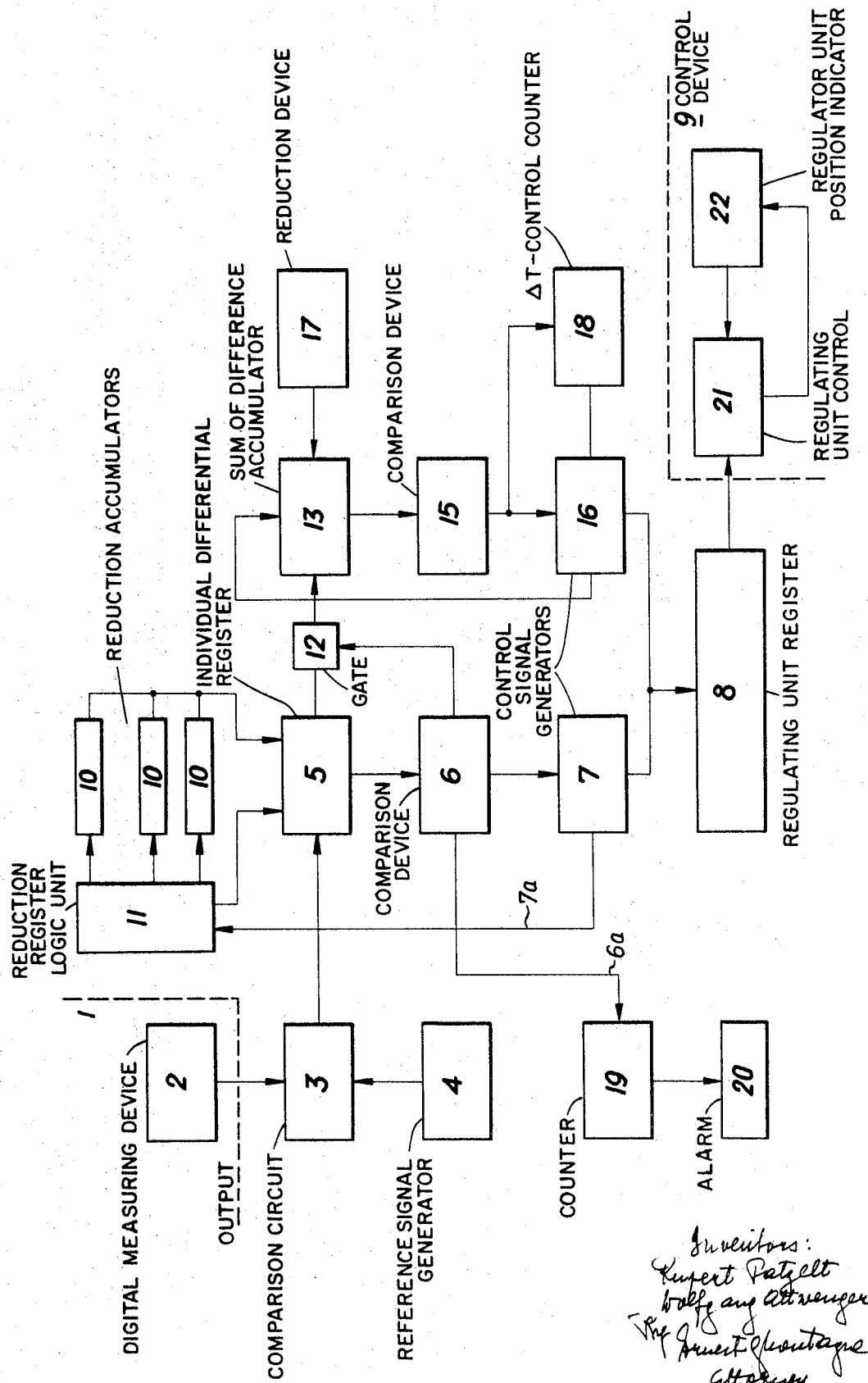

METHOD AND AN ARRANGEMENT FOR PRODUCING CONTROL SIGNALS FOR AUTOMATICALLY CONTROLLED DEVICES

The present invention relates to a method of and apparatus for the production of a control signal for automatically operating devices, whereby the control signal is derived from a digital characteristic to be measured.

In digital measuring instruments, particularly such which operate with radiation detectors, the characteristic to be measured is available continuously at the output side. Since the measuring takes place, however, discontinuously, it changes at discrete, generally periodic time intervals.

In particular, in view of the physical characteristics of the radiation detectors, the quantity to be measured is subjected to statistical oscillations $\sigma = \sqrt{N}$. The average value, however, produced by summing over a sufficiently large time over the measured values has a very good accuracy and is exactly defined.

Many industrial processes, in which such measuring instruments are applied, run continuously. A time delay between each actuation of the regulating unit and the resultant charge of the process as determined at the measuring point is unavoidable. Thus, in addition to the unavoidable flattening of the effect of a fast variation of the regulating unit, also a real time delay takes place, during which no effect at all can be demonstrated at the measuring point.

It is one object of the present invention to provide a method of and apparatus for the production of a control signal for automatically operating devices, wherein the statistical variations of the measuring result do not influence the regulating unit, while real deviations from the reference input releases as quickly as possible a reaction of the regulating unit. It is another object of the present invention to provide a method of and apparatus for the production of a control signal for automatically operating devices, wherein from each individual measuring of the digital measuring instrument the difference between the actual value and the reference input is formed, that this individual difference is stored and is compared with settable limit values for the statistical variations of the measuring value and for erroneous measurement and material faults of the measuring goods, respectively, and that by surpassing a limit value for the statistical variations by an individual difference, a control signal is rendered effective on the regulating unit control of the controlled device, while upon surpassing of another limit value for material faults and erroneous measurements, the individual difference is cancelled out and the release of a control signal is suppressed.

The apparatus for performing the method is characterized by an arrangement according to which the outputs of the digital measuring device, that delivers the actual value of the quantity to be measured and a reference signal generator are connected with a comparison circuit or device, in circuit, to which an individual difference accumulator together with the comparison device and a control signal generator are connected, whereby the latter is also connected with the regulating register for the control of the whole production device.

With these and other objects in view, which will become apparent in the following detailed description, the present invention will be clearly understood in connection with the accompanying drawing, in which the only FIGURE shows a schematic circuit of the apparatus designed in accordance with the present invention.

It is assumed that the measuring instrument comprises a digital measuring device having radiation detectors. Such measuring instruments can be used in the production of steel bands, tubes, etc. It should be emphasized, however, that the device is, as a matter of course, independent from the particular type of measuring and of the goods to be measured. Also, the derived control signal is independent from the type of production and the shape and the characteristic of the regulating unit to be controlled. The steering signal for the control member should be, however, at disposal in form of a static output value for the regulating unit of the control member, in order that the electronic regulating device of the present invention can operate in a closed loop. The type and characteristic of the regulating unit is considered in the regulating device, which steers the control member so that difference between the actual value of the adjustment of the control member and the output of the electronic regulating unit is always cancelled (reduced or eliminated). As regulating units, all control devices in production runs are considered in which the produced goods are available for digital measuring, for instance, controls of the roller distance, of nozzle-or slide devices, of the temperature, of the pressure, of the advancing speed of heating and cooling effects, the proportioning of material, changes of mixing ratios and the like.

The output stage 2 of a digital measuring device 1 which performs measurements at repeated intervals produces after each measurement a digital output signal (e.g., binary signals in parallel or serially as a pulse train, the latter constituting the described example) representing the quantity to be measured, a reference signal generator 4 provides another digital signal (e.g., in binary form, in parallel or serially as above, and in the described example a pulse train) representing the reference value, and both signals are compared in a comparison circuit 3, which produces a signal at its output that is equal to the difference between the reference value and the actual value at its both inputs; for instance, in a manner that simultaneously with the production of the measuring result, the same number of pulses is subtracted from the reference input. This individual difference representing the result of one single measurement is stored in an individual differential register 5 and is compared in a comparison device 6 and having built therein means for providing limit values. The comparison takes place with a settable limit value (limit value I) for statistical oscillations, which can amount, for instance, to two to three times the statistical variance. If an individual difference surpasses this limit value I, a signal is sent to control signal generator 7 which emits a signal from control signal generator 7 which is in turn transmitted to a regulating unit register 8. The content of this register 8 can then be changed by one step in a direction corresponding with the deviation (producing, of course, and overall reaction of the regulator opposite to the deviation), or in case a more exact adjustment to the value of the deviation is required, a number proportional to the deviation can be inserted into the register 8 and a proportional signal emitted from the register 8. All transmittals of control signals to the regulating unit register 8 must be dimensioned such, that periodic control oscillations are avoided, that means, the obtained change on the production goods must be smaller than the measured deviation from the reference input.

In order to avoid multiple consideration of a permanent material strength deviation within a measuring delay time Tv, an amount to be deducted must be subtracted from each individual difference value within this time period, which amount corresponds with the considered deviation. For this purpose, the amount to be deducted is stored for the time Tv in at least one accumulator 10. This amount to be deducted is fed from the control signal generator 7, which generator signals along line 7a into a reduction register or activating logic unit 11. By this logic unit, the amount fed into unit 11 is considered during the formation of further individual measurement differences, for instance, by adding to or subtracting from the individual subsequent measurements in the individual difference register 5 a number corresponding to the amount to be deducted. In case further individual differences, occurring within the measuring delay time, are to be considered, as many reduction accumulators 10 are required as number of measurements fall in within the time interval Tv. Three are indicated, for example, in this embodiment.

In cases where measuring error or material fault deviations from the reference input occur, which are far beyond normal limits, since the consideration of such values would strongly disturb the automatic control, they must be suppressed. That means, that the comparison device 6 must prevent an output control signal and simultaneously cancel the individual difference in the register 5, i.e., this is done when the individual difference surpasses a suitably chosen limit value II. The comparison device 6 is preferably coupled with a counter 19 for material faults and erroneous measurements in which the limit value II is surpassed, and upon surpassing of a certain number in a given time, an alarm device 20 can then be actuated through line 6a.

After the described use of the individual differences, the amount which under circumstances, is deducted is fed to a sum of difference accumulator 13, and summed up, together with all measured differences in individual measurements, independent of their magnitude, as long as they are not considered as being a result of a material fault or erroneous measurement (defined by limiting value II). The register 5 is connected with the accumulator 13 by means of a gate 12, which is opened by a pulse from the comparison device 6 upon each examination and final consideration of each individual difference. Also the number in the accumulator 13 is compared in a comparison device 15 with an adjustable limit value (limit value III). This limit is to be set such, that statistical oscillations generally do not release any control signals, and the real deviations become effective only after a summing time period longer than Tv. The sum is performed by accumulator 13. Here also there is again provided a control signal generator 16, which, in the above described manner, upon receiving an output signal from the comparison device 15, feeds a control signal to the regulating unit register 8. Here also, the control signal generator 16 feeds a second control signal to the sum of difference accumulator 13. However, the considered deviation signal is subtracted only once.

The longer the summing time (summing time of the individual differences in the sum of difference accumulator 13), considerably much smaller material deviations lead to a surpassing of the set limit value. Since the value of the control signal, which is fed to the regulating unit register 8, should correspond to about the caused material deviation, the value of the control signal must be lowered with increasing summing time (by a Δ T-control counter 18). By this arrangement, also very small material deviations can be controlled and simultaneously the amplitude of the unavoidable control oscillations can be kept at a small value.

The transmission of the control signal to the regulating unit register 8 takes place such, that upon surpassing of the prevailing limit value, the register 5 and the accumulator 13, respectively, are set to zero. The duration of the counting is made to correspond thereby to the value of the deviation. During the counting, the reference input is adjusted in the regulating unit register 8 by pulses of a corresponding chosen value emitted by generators 7 and 16 (which is under circumstances influenced by the Δ T-control counter 18) which is likewise proportional to the deviation.

The counter 18 considers the sum time based on the signals which are received from the comparison device 15.

The regulating unit register 8 is intimately connected with the regulating unit control 21 of the control device 9 such, that the influence of the material strength occurs equally over the entire range. The characteristic considered, of the production run are to be considered in the setting of the necessary values in the comparison devices 6 and 15, as well as in value ratios of the control signal transmission, likewise the measuring delay time in the logic 11 for the reduction of the individual difference values. In the intimate connection of the regulating unit register 8 with the regulating unit 21, also further variable parameters of the production can be considered, as for instance, appreciable changes of the material mixture flowing thereto which makes necessary an essential change of the setting of the regulating unit and its adjustment over the sensitive control circuit leads to complications. With the regulating unit control 21 there can also be connected a regulator unit position indicator 22.

Since also the sum of difference is subjected to statistical oscillations, the absolute value of which increases with the root of the number of the sum measurings, the statistical oscillations can reach any fixed set point after a correspondingly large summing time and may lead to nonreal control signals. If the function of the sum of difference divided by the root of the number of measurings could be formed, nonreal control signals based on the statistical oscillations could be avoided; since the oscillation of this function is constant, real deviations of the material strength lead, however, to a continuously increasing function value. If the effect of a surpassing of a sum of difference limit value (limit value III) to the regulating unit register diminishes simultaneously with the reciprocal value of the measuring, an ideal function control results. This can be obtained exactly, however, only with a process controlling electronic calculating machine. A function with a similar effect can also be obtained by different means.

One can prevent the continuous increase of the statistical oscillations of the content in the sum of difference accumulator 13 also such, that the content is divided into periodical distances by a reduction device 17 by a suitable number. Based on the functional connections, the deviations are thereby sufficiently preferred over the statistical variations.

For electronic reasons, the content of the accumulator 13 can be divided, for instance, very simply, for example, by displacing the content of a binary counter for 1-bit position. By this arrangement deviations of portions of the median oscillation can be controlled reliably in an individual measuring. If the division is adjusted to the time distance of the division and the setting of the limit values of the sum of difference accumulator relative to each other and to the device to be controlled, extremely favorable conditions result.

It has been made possible by the present invention to exploit the highly obtainable exactness of long summing times and to suppress the disturbing influence of the statistical oscillations effectively. The invention can, for instance, have application in production processes, in which the thickness measuring devices are set in, with appropriate limit values, as in the manufacture of asbestos, cement plates, steel sheets, cartons, synthetic material plates, glass plates, and the like. Yet, also other parameters, such as temperature and similar matters, and digital pressure can also be determined, so that all the production processes in which these parameters have to be watched, can use the present invention. The invention can be used, however, also in connection with other measuring devices, for instance, of optical and electrical nature.

While we have disclosed on embodiment of the present invention, it is to be understood that this embodiment is given by example only and not in a limiting sense.

We claim:

1. A method for the production of a control signal for automatically operated devices, wherein said control signal is derived from successive digital values to be measured at repeated times, comprising the steps of
   repeatedly forming the individual difference signal between an actual measured digital value and a reference value of each individual measurement,
   storing said individual difference signals,
   comparing each of said individual difference signals with a settable first limit value representing statistical variations of the measured values and representing erroneous measurings and material faults of the goods to be measured,
   emitting a control signal, upon surpassing of the limit value for the statistical variations by an individual difference signal, to a regulating unit control of a control device, and
   cancelling said individual difference signals and suppressing the emittance of said control signal upon surpassing a second limit value representing said erroneous measurings or material faults.

2. The method, as set forth in claim 1, which includes the step of
   deducting an individual difference signal from all individual difference signals occurring within a measuring delay time period forming subtracted signals for prevention of a multiple consideration of a difference of a measured value from said reference value within the measuring delay time.

3. The method, as set forth in claim 2, which includes the step of
storing said already considered individual difference signal in a reduction accumulator during said delay time.

4. The method, as set forth in claim 1, which includes the step of
stopping the consideration of further individual difference signals.

5. The method, as set forth in claim 4, which includes the step of
emitting an additional control signal upon occurring of an individual difference signal of reversed polarity surpassing said settable first limit value.

6. The method, as set forth in claim 1, which includes the steps of
storing the number of surpassings of said second limit value representing said erroneous measurings or material faults, and
actuating a means upon surpassing of said second limit value.

7. The method, as set forth in claim 2, which includes the steps of
adding said subtracted signals and storing same over a summing time period,
comparing said added signals with a settable third limit value, and
emitting control signals upon surpassing of said third limit value.

8. The method, as set forth in claim 7, which includes the step of
modifying said added signals according to a predetermined function of the number of added measurings.

9. The method, as set forth in claim 8, wherein
said function is the square root of the number of added measurings.

10. The method, as set forth in claim 2, wherein
said first and third limit values are chosen such that the statistical variations do not actuate control signals, and real deviations from said reference value in the form of individual difference signals greater than said first limit value become effective only after a sum time period, which is longer than said measuring delay time.

11. The method, as set forth in claim 10, including the step of
diminishing the value of said control signals with increasing time periods.

12. The method, as set forth in claim 7, which includes the step of
reducing to zero said stored signals upon surpassing said limit values.

13. The method, as set forth in claim 12, wherein
said summing time period controls the frequency of a control signal generator.

14. The method, as set forth in claim 12, which includes the step of
dividing periodically by a predetermined amount the content representing said added signals.

15. The method, as set forth in claim 14, wherein
said division, and the setting of said limit values are coordinated to each other and to the device to be controlled.

16. An apparatus for the production of a control signal for automatically operated devices, wherein said control signal is derived from successive digital values to be measured at repeated times, comprising
a digital measuring device,
a reference signal generator,
a comparison circuit connected to the output of said reference signal generator,
the output of said digital measuring device being connected with said comparison circuit,
an individual difference register connected to the output of said comparison circuit,
a comparison device connected to the output of said individual difference register and comparing the contents of said individual difference register with a limit value,
a control signal generator connected to the output of said comparison device, and
a regulating unit register responsive to said control signal generator for the control of the apparatus.

17. The apparatus, as set forth in claim 16, which includes
an activating logic unit having an input connected to said control signal generator,
reduction accumulators connected to outputs of said activating logic unit, respectively, and
said individual difference register, responsive to said reduction accumulators.

18. The apparatus, as set forth in claim 17, which includes
a sum of difference accumulator,
a gate connecting said individual difference register with an input of said sum of difference accumulator,
said comparison device controlling said gate, another comparison device connected to the output of said sum of difference accumulator and comparing the contents of said sum of difference accumulator with another limit value, and
another control signal generator connected to the output of said another comparison device, and said regulating unit register responsive to said another control signal generator.

19. The apparatus, as set forth in claim 18, wherein
control means for said another control signal generator, and
the output of said another comparison device is connected with said another control signal generator and said control means for the latter.

20. The apparatus, as set forth in claim 18, which includes
a reduction device means for the periodic reduction of the content of said sum of difference accumulator and
said sum of difference accumulator is responsive to said reduction device means.